United States Patent
Leivenzon et al.

(10) Patent No.: US 6,657,409 B1
(45) Date of Patent: Dec. 2, 2003

(54) CONTROL SYSTEM AND METHOD FOR AN AUTOMATIC DOOR OR GATE

(75) Inventors: Jack Leivenzon, Highett (AU); Simon Leivenson, Highett (AU); Geoffrey John Baker, Geelong (AU); Ray Russell Hawkins, Frankston (AU)

(73) Assignee: Automatic Technology Australia Pty. Ltd., Highett (AU)

( * ) Notice: Subject to any disclaimer, the term of this patent is extended or adjusted under 35 U.S.C. 154(b) by 0 days.

(21) Appl. No.: 09/979,264
(22) PCT Filed: May 19, 2000
(86) PCT No.: PCT/AU00/00486
§ 371 (c)(1),
(2), (4) Date: Feb. 27, 2002
(87) PCT Pub. No.: WO00/72436
PCT Pub. Date: Nov. 30, 2000

(30) Foreign Application Priority Data

May 21, 1999 (AU) .............................................. PQ 0509
Dec. 1, 1999 (AU) .......................................... PQ 4395

(51) Int. Cl.⁷ ................................................ H02H 7/08
(52) U.S. Cl. ........................ 318/476; 318/468; 318/286; 318/452; 318/667; 318/466; 318/469; 318/470
(58) Field of Search .............................. 318/468, 286, 318/452, 466, 467, 469, 470, 603, 282, 476

(56) References Cited

U.S. PATENT DOCUMENTS 5,789,887 A * 8/1998 Elischewski ................ 318/468
6,067,753 A * 5/2000 Hebda .......................... 49/345

* cited by examiner

Primary Examiner—Karen Masih
(74) Attorney, Agent, or Firm—Banner & Witcoff, Ltd.

(57) ABSTRACT

A control system for a door or gate which is movable between an open position and a closed position by an automated operator, comprising a door travel organizer which divides the door travel into a plurality of segments and each segment into a plurality of sectors; a sensor to sense at each sector, the resistance of the door or gate against opening and closing whilst moving between the open position and the closed position over a predetermined number of open close cycles, and to generate at least one signal representative of that resistance in each segment over the open close cycle, a recorder connected to the sensor to receive each representative signal and to store such a signal; a comparator to compare each signal with a resistance trip point set for each segment and generate a resistance profile for the door or gate over an open close cycle of the door or gate; a calculator to calculate the resistance trip point for the door or gate for each segment based upon the highest resistance encountered in any sector of that segment; and a controller to receive each trip point and set each trip point as a threshold for each segment such that if resistance of the door or gate sensed by the sensor in any sector exceeds that threshold for that interval, the movement of the door or gate is interrupted.

16 Claims, 3 Drawing Sheets

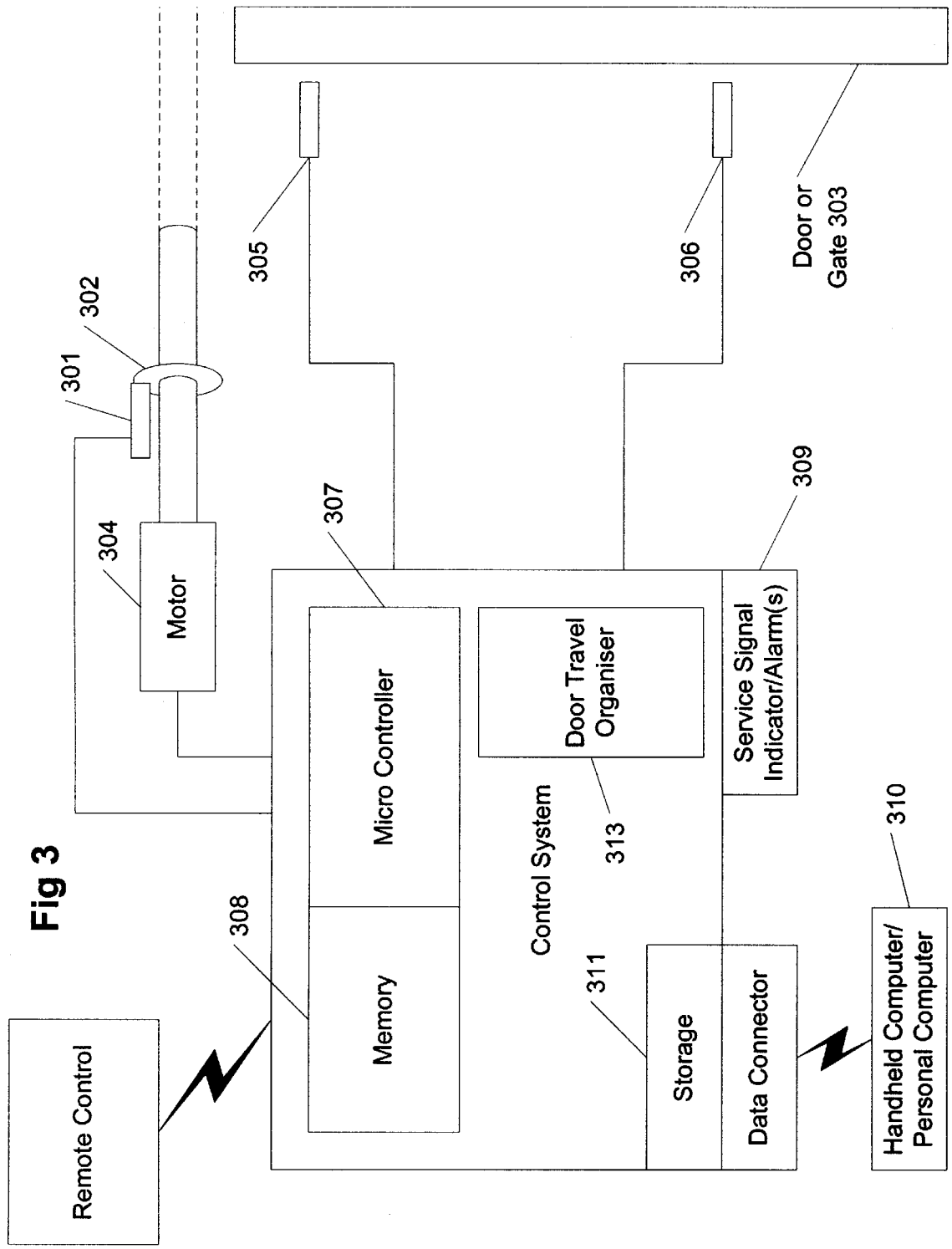

CONTROL SYSTEM AND METHOD FOR AN AUTOMATIC DOOR OR GATE

This is a U.S. National Phase Application Under 35 USC 371 and applicant herewith claims the benefit of priority of PCT/AU00/00486 filed May 19, 2000, which was published Under PCT Article 21(2) in English and Application No. PQ 0509 filed in Australia on May 21, 1999 and PQ 4395 filed in Australia on Dec. 1, 1999

FIELD OF THE INVENTION

The invention relates to a control system for a gate or door which is operated by an automated operator.

BACKGROUND TO THE INVENTION

Whilst the following description is in terms of rolling door assemblies, it will be readily apparent that the invention relates to any type of door or gate which is opened and closed using an automated operator.

It is commonly known that the load experienced by a rolling door over its normal up and down travel path varies considerably. Typically, conventional door operators have only one overload trip point setting for each direction of door travel. This trip point is incorporated to interrupt the direction of travel of the door or gate where resistance to the movement of the door or gate exceeds that point. This conventional trip point setting must be adjusted for the heaviest section of the door's travel. That is the section over which the load is greatest. As the trip point is in effect adjusted to a level to account for the worst situation in the travel path, consequently a heavy load is needed to trip the door in sections where the loads are lighter.

For example, the trip point may be incorporated into the door mechanism to avoid the door or gate operator becoming overloaded by an obstruction in the door's path preventing its movement. Likewise, for safety reasons the conventional door is required to reverse its direction of travel if such an obstruction occurs such as a person being in the door travel path. Clearly, the approach of setting the trip point dependent upon the heaviest load may result in injuries to a person who obstructs the door in its travel.

It is also commonly known that the load experienced over the travel of the door alters over time and with usage. Conventional door operators typically have an overload trip point which, once set, is fixed. Consequently, the door operator is unable to adjust to variance in normal door resistance load over time. This manifests itself as poor overload sensitivity after some time. Such manifestations may include a door which fails to shut or open as the door will travel until the load trip point is exceeded and the door reverses. Conversely, the loads may become so light that considerable pressure will be applied to an obstruction before the trip point is exceeded and the travel direction of the door reversed.

OBJECT OF THE INVENTION

It is therefore an object of the invention to provide a control system which ameliorates one or more of these problems.

DESCRIPTION OF THE INVENTION

According to one particularly preferred form of the invention, there is provided a control system for a door or gate which is movable between an open position and a closed position by an automated operator, comprising:

(a) a door travel organiser which divides the door travel into a plurality of segments and each segment into a plurality of sections;

(b) a sensor to sense, at each sector, the resistance of the door or gate against opening and closing whilst moving between the open position and the closed position over a predetermined number of open-close cycles, and to generate at least one signal representative of that resistance in each segment over the open-close cycles;

(c) a recorder connected to the sensor to receive each representative signal and to store such a signal;

(d) a comparator to compare each signal with a resistance trip point set for each segment and generate a resistance profile for the door or gate over an open-close cycle of the door or gate;

(e) a calculator to calculate the resistance trip point for the door or gate for each segment based upon the highest resistance encountered in any sector of that segment; and (f) a controller to receive each trip point and set each trip point as a threshold for each segment such that if resistance of the door or gate sensed by the sensor in any sector exceeds that threshold for that segment, the movement of the door or gate is interrupted.

Typically, the resistance of the door or gate is sensed by monitoring the speed of the door over the open-close cycle. It is thought that speed is representative of that resistance. As such, by recording the speed profile of several open-close cycles and averaging the minimum speeds of each segment, the trip point can be set for each segment at a value which is more closely aligned to the characteristic resistance for that segment.

Consequently, in any one segment, if an obstruction is encountered, only the trip point set for that segment need be exceeded to cause interruption of the movement of the door or gate.

In another preferred form of the invention the control system further comprises an alarm which is operable upon the controller interrupting the movement of the door or gate.

In another form of the invention the control system further comprises an alarm which is operable when the resistance profile of the door or gate exceeds predetermined maximum profile points. In this way, if the resistance of the door or gate builds up over time which is a typical characteristic of doors, an alarm may be provided to indicate that maximum resistances are being approached. This will indicate that servicing of the door or gate is needed.

Preferably, the resistance profile of the door or gate will be established by monitoring enough open-close cycles so that any abnormal representative signals do not cause aberrant trip points to be set. In this respect, the number of cycles is expected to be at least 8.

Suitably the control system comprises a remote trigger which operates to ensure that the door or gate cannot be operated by a remote control until the resistance profile of the door or gate has been established.

Preferably, the control system further comprises an immobiliser to immobilise the door or gate if the signal for any segment exceeds the trip point set for that segment by a predetermined value. In this arrangement, if the variation in this signal is exceeded by, for example, 10% or 20%, which means that the door or gate and/or operator are in danger of failing, the immobiliser causes the mechanism to stop. Preferably, the system further comprises another alarm which is activated if the immobiliser is activated.

Typically, the alarms referred to above may be a visual and/or audible display such as a series of lights or sounds.

It is possible to have a single alarm which produces the function of all the alarms mentioned above. For example, the first condition, when the notification signal is received, may be displayed by illuminating two of the LED's. When the immobiliser is active, then all four of the LED's may be displayed.

The control system may also include a set up facility. The set up facility may include means for adjusting a predetermined resistance value exerted by a motor on a door or gate at which the immobiliser causes the mechanism to stop. The adjustment means may be such as to allow an installer to vary the predetermined resistance value at the site where the control system has been installed. The set up facility may include means to run the door through an open and close cycle so that the normal operating resistance parameters of the door installed at the site may be sensed and used to set a predetermined resistance value for operation of the door.

The control system may also include a default safety resistance value. This may be preset in the factory. The set up facility may also include means to alter the default safety resistance value on site. The magnitude of the default safety resistance value may be the primary determinant for immobilising the door, regardless of the setting of the predetermined resistance value.

In another preferred form of the invention there is provided a method of controlling a door or gate which is movable between an open position and a closed position by an automated operator, comprising the steps of:

(a) dividing the door travel into a plurality of segments and subdividing each segment into a plurality of sectors;

(b) sensing, at each sector, the resistance of the door or gate against opening and closing whilst moving between the open position and the closed position over a predetermined number of open-close cycles, and for each segment generating at least one signal representative of the sector in that segment having the highest resistance over the open-close cycles;

(c) recording and storing each representative signal;

(d) generating a resistance profile of the segments for the door or gate over an open-close cycle of the door or gate;

(e) calculating a resistance trip point for the door or gate for each segment based upon the resistance profile;

(f) setting each trip point as a threshold for each segment; and (g) for each segment of movement of the door or gate comparing such threshold to the resistance of the door or gate in the sectors of that segment and interrupting the movement of the door or gate if that threshold is exceeded.

The resistance profile may suitably be generated on the basis of the running average of the lowest sector speed for each segment.

According to another independent form of the invention, there is provided a diagnostic system for a door or gate which is movable between an open position and a closed position by an automated operator, comprising:

(a) a sensor to sense, at predetermined intervals, the resistance of the door or gate against opening and closing whilst moving between the open position and the closed position over a predetermined number of open-close cycles, and to generate at least one signal representative of that resistance in each segment over the open-close cycles; and (b) a recorder connected to the sensor to receive each representative signal and to store such a signal.

Typically, the resistance of the door or gate is sensed by monitoring the speed of the door over the open-close cycle. It is thought that speed is representative of that resistance. As such, by recording the speed profile of several open-close cycles and averaging them, the trip point can be set for each segment.

Using this diagnostic system, it is possible to produce a representation (eg graphs) of the resistance in door or gate travel over the open-close cycle. These can be used to identify sections of the door or gate travel of significant resistance and by comparison, determine the door geometry which provides the most efficient load profiles. This information may also be used to identify areas in the door mechanism which may require servicing. Especially if the door or gate resistance profile is built up over a period of the life of the door. This means that preventative maintenance may be carried out rather than the repair scenario which is common now.

Typically the diagnostic system will be in two parts. The first will be a data storage device affixed to the door or gate controller and provided with a data outlet port. The second part will be a hand held computer with a data input port compatible with the data output port. The data will be down loaded into the hand held computer. Comparisons with other earlier down loaded data for the same door or gate may be made so that resistance changes may be considered. Similarly, that data may be compared to information received on the resistance characteristics of other doors and gates. This enables servicing to be carried out and simultaneously the results of the servicing in terms of resistance adjustment may be monitored.

In yet a further form of the invention there is provided a control system for a door or gate which is movable between an open position and a closed position by an automated operator, the automated operator including a drive motor, the control system comprising:

a) a pulse encoder associated with said motor generating pulses at a frequency proportional to the motor speed, with the number of pulses generated being an indication of the relative position of the door or gate, such that the pulse encoder is able to provide an indication of the resistance of the door or gate against opening or closing whilst moving between the open and the closed position over a predetermined number of open-close cycles, and thereby generates at least one signal representative of that resistance in each sector over the open-close cycles;

b) a door travel organizer arranged to act upon the signals provided by said pulse encoder, the organizer dividing the door or gate travel into a plurality of segments, and each segment into one or more sectors, each sector being equivalent to the interval between two encoder pulses;

c) a recorder connected to the sensor to receive each representative signal and to store such a signal;

d) a comparator to compare each signal with resistance trip point set for each segment and generate a resistance profile for the door or gate over an open-close cycle of the door or gate;

e) a calculator to calculate the resistance trip point for the door or gate for each segment based upon the highest resistance encountered in any sector of that segment; and f) a controller to receive each trip point and set each trip point as a threshold for each segment such that if resistance of the door or gate sensed by the sensor in any sector exceeds that threshold for that interval, the movement of the door or gate is interrupted.

Each segment may thus comprise a single sector, such that the resistance trip point for each segment is based upon the resistance encountered in that one sectors.

DETAILED DESCRIPTION OF OTHER PREFERRED EMBODIMENTS

The invention will be further illustrated with reference to the accompanying drawings in which:

FIG. 3 is a diagram of components of a control apparatus.

(a) KEY CONTROL SYSTEM COMPONENTS

Figure 1:
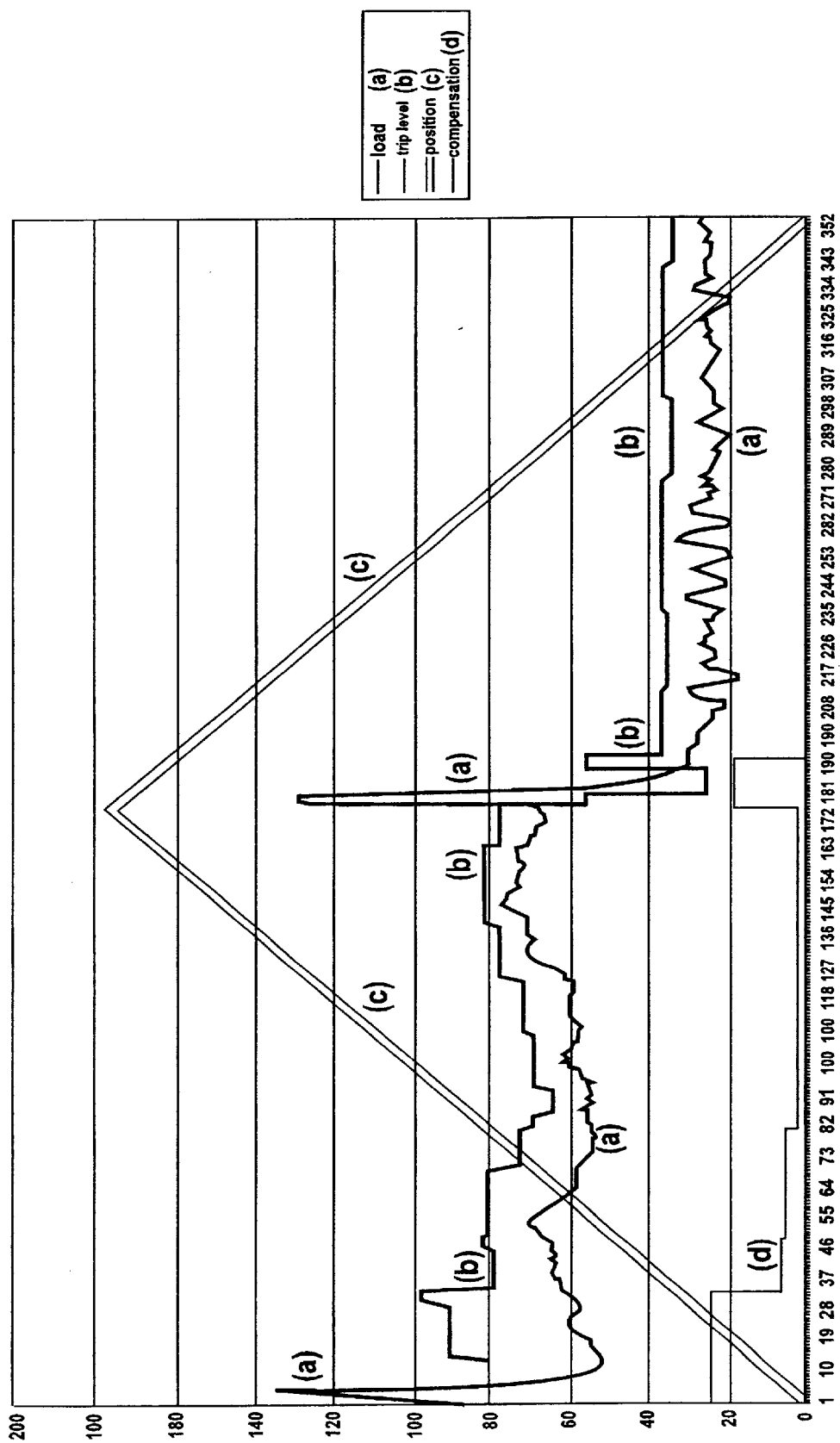
FIG. 1 is a graph of the trip point settings according to the invention over a single open-close cycle.

1. Motor shaft encoder. This device 301 is located upon the motor shaft 302 of the drive motor 304 which causes the door or gate 303 to open or close. The encoder 301 generates electrical pulses (signals) of a frequency proportional to the motor speed. The frequency of the pulses is used to determine the motor's speed while the number of the pulses generated is used to track the door's position.

2. Motor travel limit switches. Typically, conventional automated doors or gates 303 will have end limit switches (figuratively depicted in FIG. 3 by references 305–306) which cause the drive motor 304 to stop when the door or gate 303 reaches the end of its opening or closing limit. These are set by counting the number of pulses generated by the encoder 301. These switches 305–306 are used to reset the door's position count. Both the open limit and the closed limit have defined position count values. Alternatively, the position of the door may be set by a single switch. In such arrangement the position of the door can be monitored and controlled by counting pulses corresponding to the door travel relative to the switch position.

3. μcontroller. The μ-controller 307 monitors the motor shaft encoder 301 and motor travel limit switches 305–306 to determine the motor's speed and the door's position. Given these, the appropriated overlap "trip point" setting can be selected as described more fully below.

4. Non-volatile memory 308. Used by the μ-controller 307 to store the sampled motor speed profiles, the limit switch position counts and various other perimeters.

5 Close position count. This position is set to zero and is forced into the position count when the close limit is actuated.

6. Service Indicator. This includes the facility to count the number of open/close cycles of the door. A service signal indicator 309 such as a flashing light or an audible alarm may be provided to indicate that the device is due for servicing after a predetermined number of cycles. It may include an over-ride function which can reduce the number of cycles run before the service signal is activated. This early activation may be based upon the door coming closer to the overload or default resistance value than a predetermined tolerance over a number of cycles. A handheld computer 310 may have an input capacity which allows the operator to change the number of predetermined cycles required before the service signal becomes activated.

7. Travel Segment. Since memory is a limited resource and from a practical perspective storing the motor speed profile for each pulse count of the door or gate travel would be excessive, the travel of the door is broken into segments by the door travel organizer 313. The speed profile of the door is constructed by storing the minimum speed detected over each segment of travel. The current segment is determined by the dividing the position count by the number of counts per segment. In effect dividing the position count by the number of counts per segment has the effect of further dividing each segment into sectors. Typically, 32 and 16 counts per segment (equivalent to 32 and 16 sectors) are selected. The segment number is used to address the motor speed profile table location that relates to the current position of the door length of a segment. This variation is particularly applicable where the lengths of the segments are chosen on the basis of regions where the door travels at a substantially constant speed over one segment and at a different speed in the next segment.

There may be one or more segments. Whilst a fixed number of counts (eg. 32 or 16) per segment may be used it is also possible to vary the number of counts per segment and hence the Consequently, as the door goes through a open-close cycle the speed of the door is monitored over segments (made up of pulses) or segments of that travel. A minimum speed component for each segment is recorded and stored. A resistance profile is generated for the door or gate by carrying this procedure out over a number of open-close cycles. That resistance profile is used to set the trip point for each segment against which subsequent detected speeds in any one segment are compared.

As will be seen from FIG. 1 a graphical representation of the control system is depicted. The Y axis is load and position. The X axis are pulses (eg 16 pulses per segment) measured while the door completes one open-close cycle.

Consequently the plot of "position (c)" of the door moving edge starts at zero and continues to a fully open position which is designated by the apex of the plot at pulse 181 and then returns to the fully closed position at zero again as designated at pulse 352.

The graph represents "load" by measuring the speed of the motor. However, this is not an accurate measurement in the first few pulses as the motor is just beginning to start. Thereafter the representation is more accurate to the load conditions as the door is raised and rolled. A similar observation may be made for each time the motor in actuated. The second portion of the "load" line is less than the first because the weight of the door as it unrolls in the second portion will assist the travel and therefore lesser loading is present.

The "trip level" is calculated having regard to the load profile of the door taken over a number of open-close cycles. As mentioned above, representative minimum speed readings are taken for each segment (eg every 16 pulses) of the travel of the door and a representative profile of the resistance is established during those prior cycles. The trip level is set at a percentage above that representative profile. That trip level is designated as (b). In the initial ten pulses of the door travel, this trip level is exceeded by the door load. However, comparison of that load to the trip level is deliberately suppressed (eg for 1 second) to ensure the travel of the door is not interrupted when the characteristic initial high load is experienced.

The compensation (d) is included to compensate for changing conditions (such as temperature) which causes the speed of the motor to decrease for any reason other than load. Under these conditions load (a) is elevated on the graph and therefore trip level (b) must also be elevated to maintain a consistent load margin between the two to prevent interruption of the door movement. As shown in the first part of the graph, the initial compensation is set to a maximum level which artificially raises the trip points for each segment to ensure that a motor which is running slower due to temperature is not interpreted as having an increased load. As travel proceeds, the actual motor speed is compared to that stored in the memory for each segment and then the compensation is appropriately reduced. This is the initial step down on (d) and the smaller steps in (d) due to the motor warming. A similar compensation is apparent at the changing of direction of the door at pulses 181–195 for the same reason.

It will be readily apparent from the graph that load (a) has variable load characteristics compared to the trip level which was obtained by averaging. Consequently, the variations between those plots is not consistent. However, using the approach of the invention it is possible to provide a dynamic system which matches the trip levels to the door load characteristic. This ensures a better alignment of the load needed to cause interruption of the movement of the door to the fixed trip level approach currently adopted.

Figure 2:
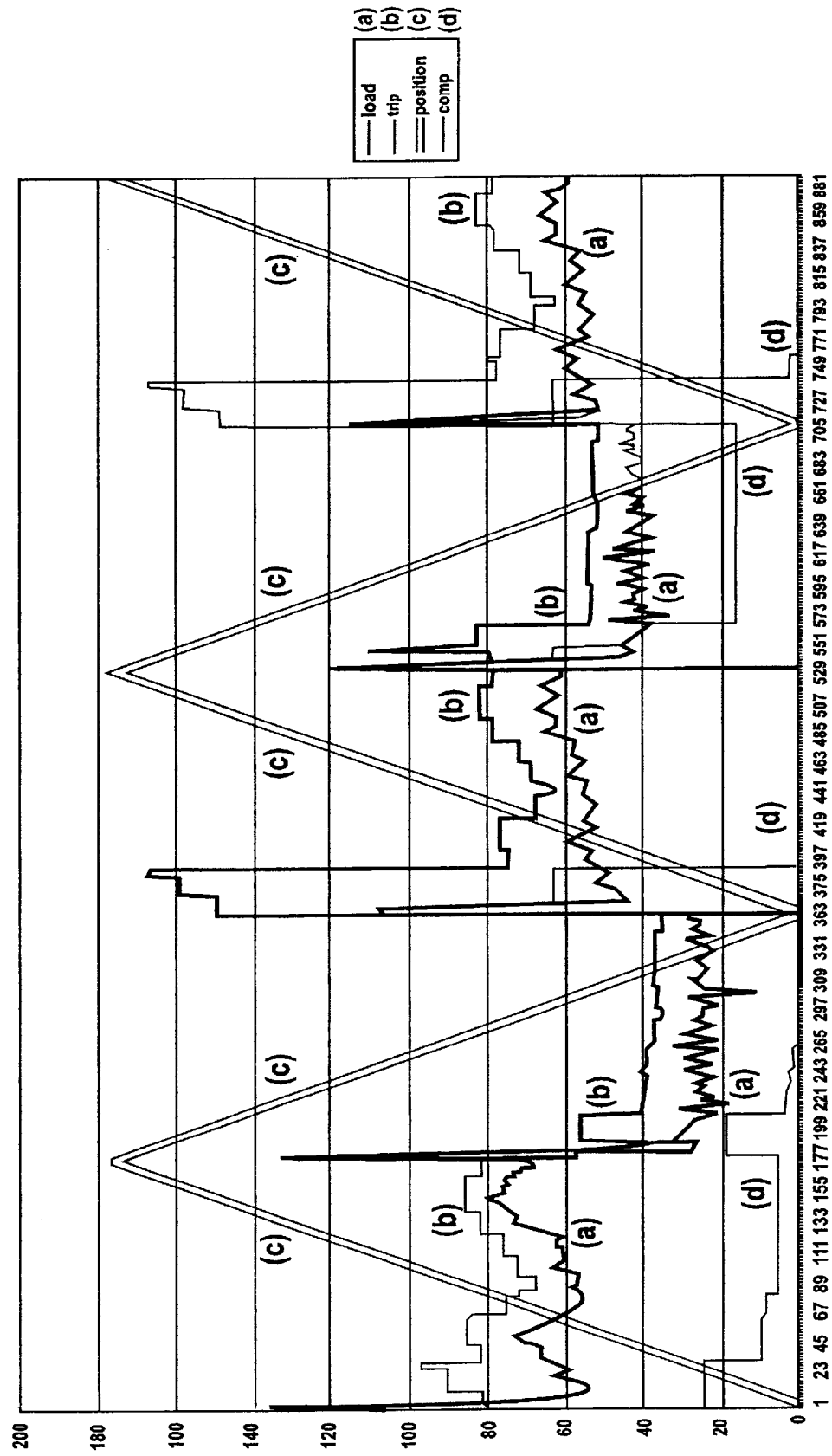
FIG. 2 is a graph of a trip set point settings according to the invention over a plurality of open-close cycles.

In FIG. 2 a graphical representation of the control system is depicted. The Y axis and X axis are the same as in FIG. 1. However, unlike FIG. 1, this plot is for the two and a half open-close cycles. Apart from this difference the above description equally applies to this graph.

(b) Data Logging and Diagnostics

Since the controller described above has the ability to monitor the motor's speed and position, this information may also be utilised for data logging and diagnostic purposes.

Whenever the door is opening or closing the motor's speed, position and obstruction speed trip point are output in a customized serial format to storage 311. This data stream can be logged or monitored using a hand held terminal or a personal computer (with a special interface) 310. From this data it is possible to plot motor speed and obstruction trip speed verses door position. These can be used to identify sections of resistance in door travel and, by comparison, determine the door geometry which provides the most efficient load profile. The plots can also be used to monitor the performance of the automatic sensitivity feature of the controller.

Using the hand held programmer 310, it is possible to interrogate the door controller's control data memory 308. Consequently, the above describe servicing and design functions may be more efficiently and accurately carried out.

The following are examples of the data which may be interrogated.

| | |
|---|---|
| Margin | The percentage deducted from the average speed to give the obstruction trip speed |
| Compensation Margin | The percentage initially added to the Margin to allow for temperature or other non load related variations |
| Auto-close time | The time the controller holds the door in the open position after an open cycle before it automatically closes the door |
| Open position count | The number of encoder pulses between the close limit switch and the open limit switch |
| Next open sample | The sample number to be used to store the next open cycle speed profile sample |
| Open speed profile 1 | A table of the minimum speeds detected in each of the door travel segments (sample 1) |
| Open speed profile 2 | A table of the minimum speeds detected in each of the door travel segments (sample 2) |
| Open speed profile 3 | A table of the minimum speeds detected in each of the door travel segments (sample 3) |
| Open speed profile 4 | A table of the minimum speeds detected in each of the door travel segments (sample 4) |
| Open speed profile 5 | A table of the minimum speeds detected in each of the door travel segments (sample 5) |
| Open speed profile 6 | A table of the minimum speeds detected in each of the door travel segments (sample 6) |
| Open speed profile 7 | A table of the minimum speeds detected in each of the door travel segments (sample 7) |
| Open speed profile 8 | A table of the minimum speeds detected in each of the door travel segments (sample 8) |
| Next close sample | The sample number to be used to store the next close cycle speed profile sample |
| Close speed profile 1 | A table of the minimum speeds detected in each of the door travel segments (sample 8) |
| Close speed profile 2 | A table of the minimum speeds detected in each of the door travel segments (sample 8) |
| Close speed profile 3 | A table of the minimum speeds detected in each of the door travel segments (sample 8) |
| Close speed profile 4 | A table of the minimum speeds detected in each of the door travel segments (sample 8) |
| Close speed profile 5 | A table of the minimum speeds detected in each of the door travel segments (sample 8) |
| Close speed profile 6 | A table of the minimum speeds detected in each of the door travel segments (sample 8) |
| Close speed profile 7 | A table of the minimum speeds detected in each of the door travel segments (sample 8) |
| Close speed profile 8 | A table of the minimum speeds detected in each of the door travel segments (sample 8) |
| Open cutouts | The number of times the motor has cut out due to excessive motor load or thermal overload while operating |
| Close cutouts | The number of times the motor has cut out due to excessive motor load or thermal overload while closing |
| Open obstructions | The number of obstructions detected while opening |
| Close obstructions | The number of obstructions detected while closing |
| Opens | The number of open cycles |
| Closes | The number of close cycles |
| Re-initializations | The number of times the door's speed profile has been manually re-initialised. |

Procedure for Set Up of Resistance Value at Installation

TO INITIALISE RESISTANCE VALUE (OBSTRUCTION FORCE)

1. Press and hold down the close button to move the door to the fully closed position.
2. Press the Reset button which then opens and closes the door. As soon as the door reaches the fully open position it will pause momentarily then start to close. The door has to do a full open and close cycle with no interruptions for the safety obstruction parameters to be calculated and set automatically.

A default safety resistance value is preset in the factory. Under normal operating conditions this value should not be changed. If you are unhappy with the pressure you can change as per below.

TO DECREASE RESISTANCE VALUE

1. Press and hold the Set button.
2. While holding down the Set button and press the Close button. A red LED will illuminate each time the Close button is pressed, to indicate that the resistance value is being reduced. When the red LED flashes continuously when the close button is being pressed this indicates that the minimum resistance value setting has been reached. To increase the resistance value go to the next step.

TO INCREASE RESISTANCE VALUE

1. Press and hold the Set button.
2. While holding down the Set button, press the Open button. A green LED will illuminate each time the close button is pressed, to indicate that the resistance value is being increased. If the green LED flashes continuously when the open button is being pressed, this indicates that the maximum resistance value setting has been reached.

The word "comprising" and the forms of the word "comprising" as used in this description does not limit the invention claim to exclude any variations of or additions to the invention.

Modifications and improvements to the invention will be readily apparent to those skilled in the art. Such modifications and improvements are intended to be within the scope of the invention.

The claims defining the invention are as follows:

1. A control system for a door or gate which is movable between an open position and a closed position by an automated operator, comprising:
   (a) a door travel organiser which divides the door or gate travel into a plurality of segments and each segment into a plurality of sectors;
   (b) a sensor to sense, at each sector, the resistance of the door or gate against opening and closing whilst moving between the open position and the, closed position over a predetermined number of open-close cycles, and to generate at least one signal representative of that resistance in each segment over the open-close cycles;
   (c) a recorder connected to the sensor to receive each representative signal and to store such a signal;
   (d) a comparator to compare each signal with a resistance trip point set for each segment and generate a resistance profile for the door or gate over an open-close cycle of the door or gate;
   (e) a calculator to calculate the resistance trip point for the door or gate for each segment based upon the highest resistance encountered in any sector of that segment; and
   (f) a controller to receive each trip point and set each trip point as a threshold for each segment such that if resistance of the door or gate sensed by the sensor in any sector exceeds that threshold for that interval, the movement of the door or gate is interrupted.

2. A control system according to claim 1 comprising means for measuring the resistance by sensing the speed of the door travel.

3. A control system according to claim 1 wherein the resistance trip point for each segment is based upon the minimum sector speed for that segment averaged over a plurality of cycles.

4. A control system according to claim 1 comprising memory means for holding a store of predetermined maximum profile resistance points and an alarm arranged to provide an indication when one or more maximum resistance points are being approached.

5. A control system according to claim 1 wherein the door travel organiser is arranged to act upon the signals of an encoder associated with a drive motor for the door or gate, the encoder generating pulses at a frequency proportional to the motor speed with the number of pulses generated being an indication of the position of the door or gate.

6. A control system according to claim 5 comprising start and end limit switches provided along the path of the door's or gate's travel for stopping the motor when the door or gate reaches preset limits of its travel, wherein the limit switches are used to set the position of the door for the door travel organiser.

7. A control system according to claim 6 comprising a data download connection for interrogating the control system by a hand held programmer to obtain operational data stored in the control system.

8. A control system according to claim 1 comprising a service signal indicator which is adapted to indicate that the door or gate is due for servicing after counting a predetermined number of cycles.

9. A control system according to claim 8 comprising adjustment means for altering the number of predetermined cycles required to be counted before the service indicator is activated.

10. A control system according to claim 1 comprising remote actuation means for remotely actuating travel of the door or gate and a remote trigger which operates to ensure that travel of the door or gate cannot be remotely activated until after the resistance profile of the door or gate has been generated.

11. A method of controlling the movement of a door or gate which is movable between an open position and a closed position by an automated operator, comprising the steps of:
   (a) dividing the door travel into a plurality of segments and subdividing each segment into a plurality of sectors;
   (b) sensing, at each sector, the resistance of the door or gate against opening and closing whilst moving between the open position and the closed position over a predetermined number of open-close cycles, and for each segment generating at least one signal representative of the sector in that segment having the highest resistance over the open-close cycles;
   (c) recording and storing each representative signal;
   (d) generating a resistance profile of the intervals for the door or gate over an open-close cycle of the door or gate;
   (e) calculating a resistance trip point for the door or gate for each segment based upon the resistance profile;
   (f) setting each trip point as a threshold for each segment; and
   (g) for each segment of movement of the door or gate, comparing such threshold to the resistance of the door or gate in the sectors of that segment and interrupting the movement of the door or gate if that threshold is exceeded.

12. A method according to claim 11 comprising the step of measuring the resistance of the door by sensing the speed of the door travel.

13. A method according to claim 11 comprising setting the resistance trip point for a segment based upon the minimum sector speed for that segment averaged over a plurality of cycles.

14. A method according to claim 11 comprising sensing the limits of travel of the gate or door with switches and setting the locations of the sectors and segments based upon the position of the switches.

15. A control system for a door or gate which is movable between an open position and a closed position by an automated operator, the automated operator including a drive motor the control system including:
   a) a pulse encoder associated with said motor generating pulses at a frequency proportional to the motor speed, with the number of pulses generated being an indication of the relative position of the door or gate, such that the pulse encoder is able to provide an indication of the resistance of the door or gate against opening or closing whilst moving between the open and the closed position over a predetermined number of open-close cycles, and thereby generates at least one signal representative of that resistance in each sector over the open-close cycles;

b) a door travel organizer arranged to act upon the signals provided by said pulse encoder, the organiser dividing the door or gate travel into a plurality of segments, and each segment into one or more sectors, each sector being equivalent to the interval between two encoder pulses;

c) a recorder connected to the sensor to receive each representative signal and to store such a signal;

d) a comparator to compare each signal with a resistance trip point set for each segment and generate a resistance profile for the door or gate over an open-close cycle of the door or gate;

e) a calculator to calculate the resistance trip point for the door or gate for each segment based upon the highest resistance encountered in any sector of that segment; and f) a controller to receive each trip point and each trip point as a threshold for each segment such that if resistance of the door or gate sensed by the sensor in any sector exceeds that threshold for that interval, the movement of the door or gate is interrupted.

16. A control system according to claim 15, wherein each segment includes a single sector, such that the resistance trip for each segment is based upon the resistance encountered in that one sector.

* * * * *